(12) United States Patent
Tatum

(10) Patent No.: US 11,032,517 B1
(45) Date of Patent: Jun. 8, 2021

(54) INTERACTIVE VIDEOCONFERENCE APPARATUS

(71) Applicant: Audie Tatum, Sacramento, CA (US)

(72) Inventor: Audie Tatum, Sacramento, CA (US)

(*) Notice: Subject to any disclaimer, the term of this patent is extended or adjusted under 35 U.S.C. 154(b) by 0 days.

(21) Appl. No.: 17/181,245

(22) Filed: Feb. 22, 2021

(51) Int. Cl.
*H04N 7/14* (2006.01)
*H04N 7/15* (2006.01)
*B25J 13/00* (2006.01)
*G06F 3/147* (2006.01)

(52) U.S. Cl.
CPC ............. *H04N 7/15* (2013.01); *B25J 13/00* (2013.01); *G06F 3/147* (2013.01)

(58) Field of Classification Search
CPC ..................................................... H04N 7/14
See application file for complete search history.

(56) References Cited

U.S. PATENT DOCUMENTS

| | | | |
|---|---|---|---|
| 2009/0146982 A1* | 6/2009 | Thielman | H05B 47/11 345/207 |
| 2009/0167676 A1* | 7/2009 | Edwards | G09G 3/3406 345/102 |
| 2017/0123932 A1* | 5/2017 | Goldstein | G06F 8/71 |
| 2019/0313050 A1* | 10/2019 | Wang | H04N 5/58 |

* cited by examiner

*Primary Examiner* — Olisa Anwah
(74) *Attorney, Agent, or Firm* — Daniel M. Cohn; Howard M. Cohn

(57) ABSTRACT

Techniques and apparatuses for interactive videoconferences are disclosed. Light sensors affixed to a frame in front of the electronic display associated with a host are configured to receive light from a localized area of the display. When a remote participant takes an action to cause a significant change in received light, by moving a dark object to a location such that it is rendered on the host electronic display in front of the light sensor, the light sensor asserts a signal. Based on the asserted signal, the state of an electrical and/or electromechanical device located at the premises of the host is changed in a way that is visible and/or audible to the remote participants via the videoconference system.

6 Claims, 12 Drawing Sheets

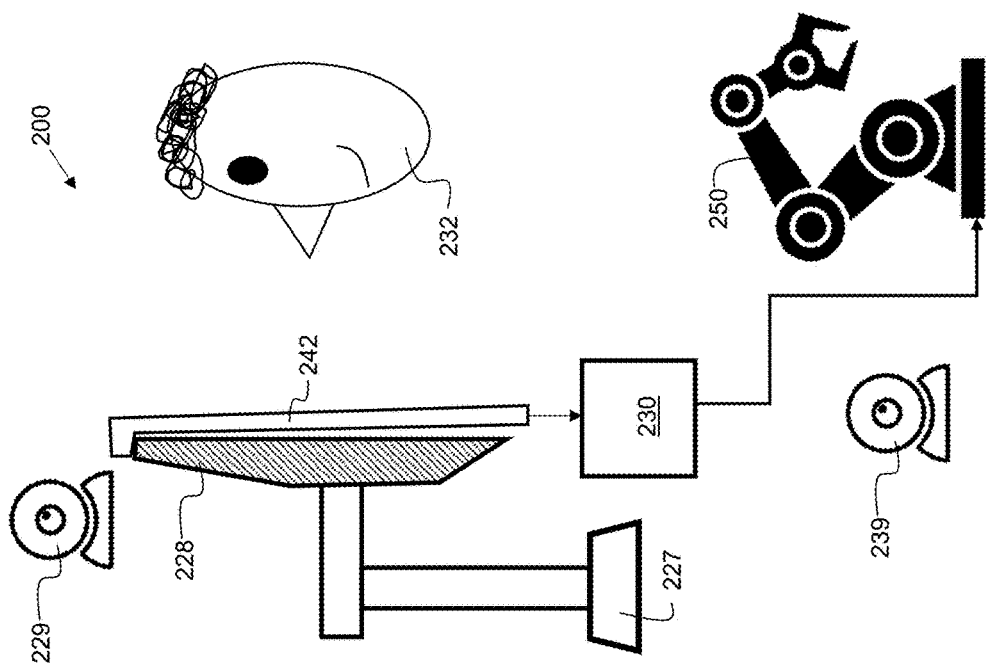
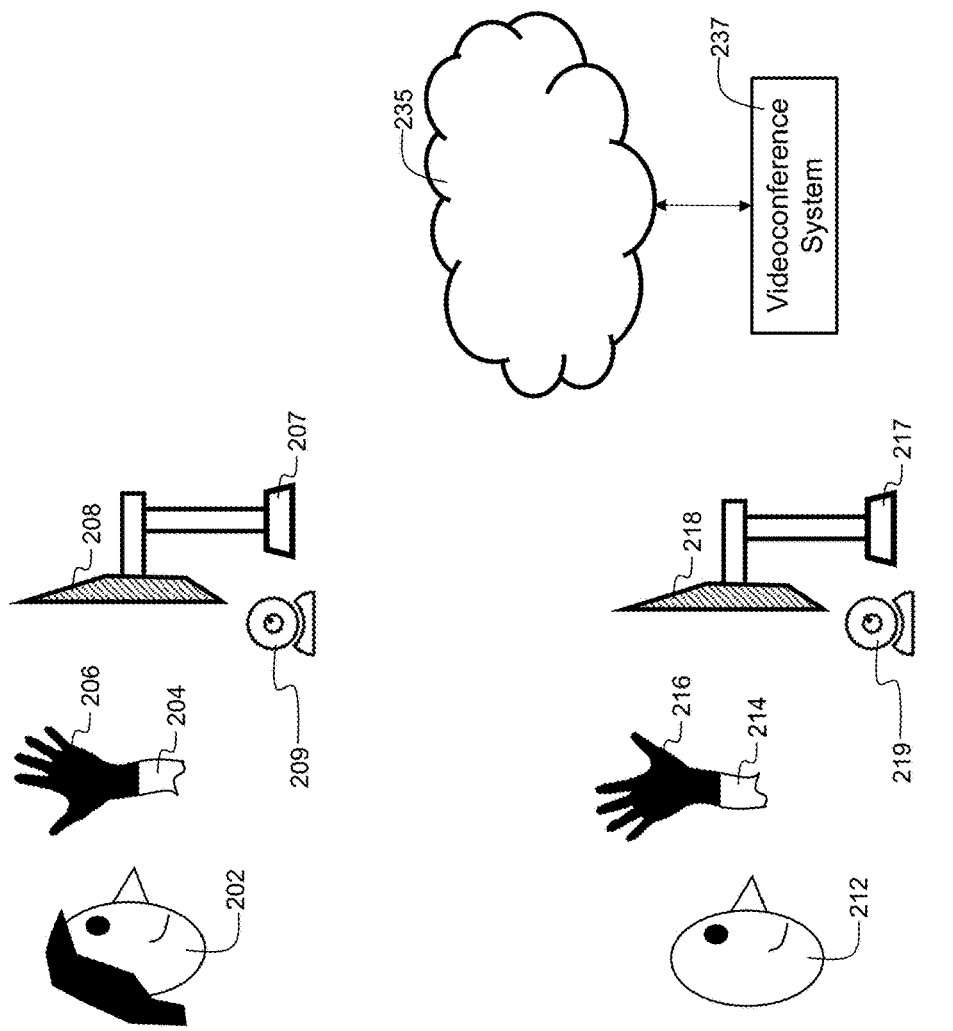
FIG. 2

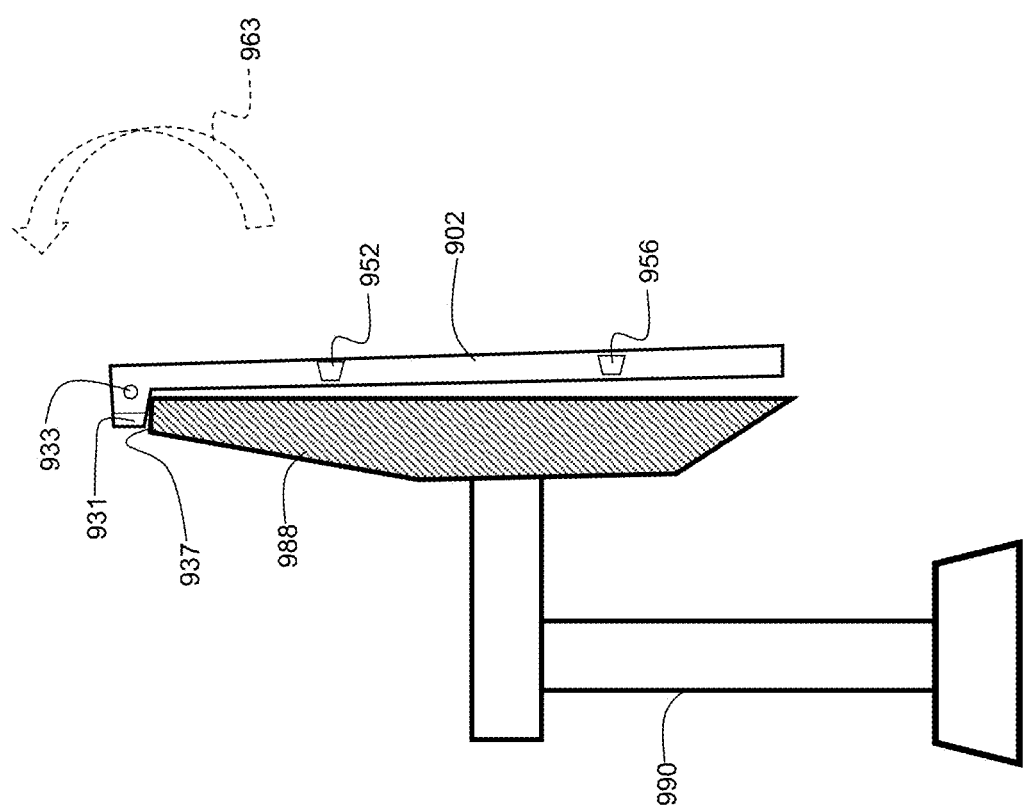

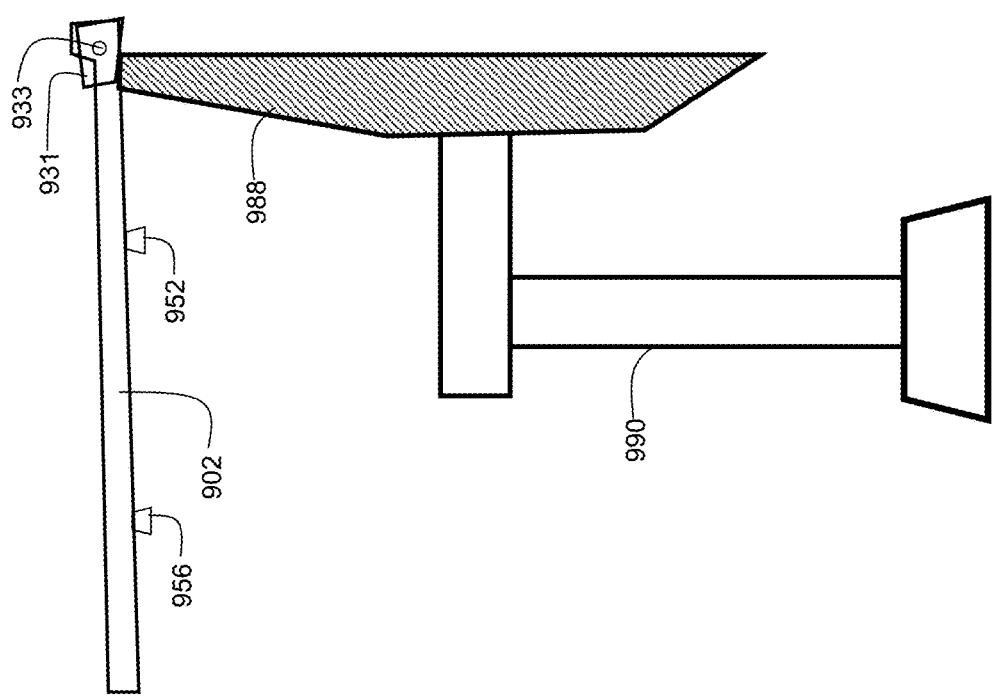

# INTERACTIVE VIDEOCONFERENCE APPARATUS

FIELD

The present invention relates generally to videoconferencing, and more particularly, to an interactive videoconference apparatus.

BACKGROUND

Videoconferencing allows participants to share audio and video during a videoconference session. To conduct a videoconference session, the participants utilize multimedia endpoints, which are typically associated with computers, tablets, smartphones, or other capable device, and are connected to a wideband network such as the Internet. Videoconferencing systems can allow participants (users) in multiple locations to communicate simultaneously with one another using two-way video and audio transmissions. Videoconferencing systems typically offer a "gallery" view that allows participants to see the video of other participants. Thus, videoconferencing can be used to conduct meetings, teach courses, and many other possibilities.

SUMMARY

In embodiments, there is provided a method for operating an electrical device via a videoconference system, comprising: positioning a plurality of light sensors in front of a first electronic display at a first location, such that each light sensor of the plurality of light sensors receives light from a localized area of the first electronic display; detecting a change in received light level below a predetermined threshold for one or more light sensors of the plurality of light sensors based on a received video feed from a second location; asserting a signal for each of the one or more light sensors that detected the change in received light level; causing a visual change in an electric device located at the first location; sending images of the electric device to a second electronic display at the second location; wherein the second location is different from the first location.

In another embodiment, there is provided an apparatus, comprising: a frame; a plurality of spars affixed to the frame; a plurality of light sensors affixed to the plurality of spars; a signal conditioning circuit electrically connected to the plurality of light sensors; and an electrically operated device electrically connected to an output of the signal conditioning circuit.

In yet another embodiment, there is provided an apparatus, comprising: a frame; a plurality of spars affixed to the frame; a plurality of light sensors affixed to the plurality of spars; a signal conditioning circuit electrically connected to the plurality of light sensors; and an electrically operated device electrically connected to an output of the signal conditioning circuit, and wherein the signal conditioning circuit comprises: a first relay coupled to a first light sensor from the plurality of light sensors; and a second relay coupled to a second light sensor from the plurality of light sensors.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
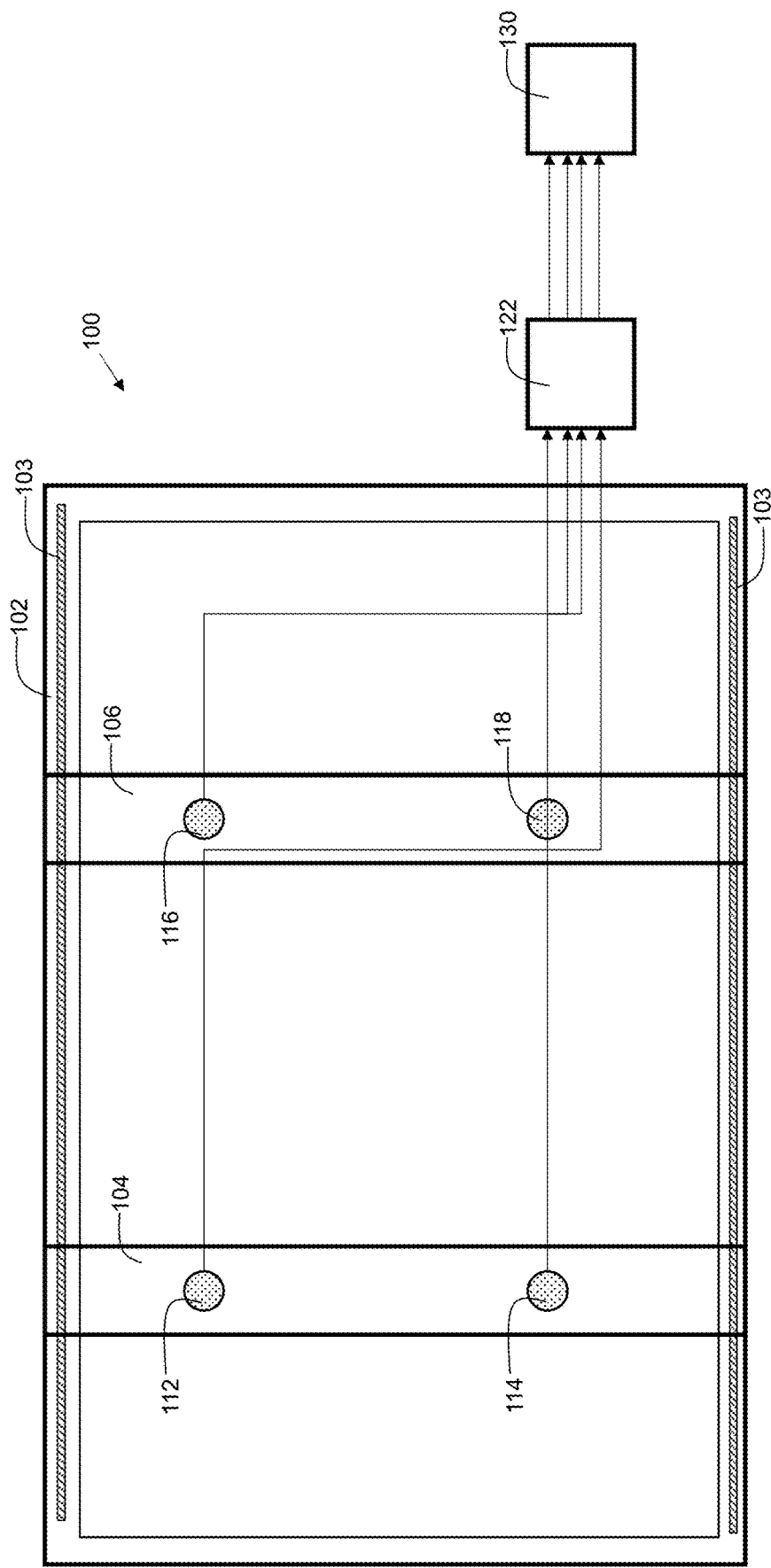

Often, similar elements may be referred to by similar numbers in various figures (FIGs) of the drawing, in which case typically the last two significant digits may be the same, the most significant digit being the number of the drawing figure (FIG). Furthermore, for clarity, some reference numbers may be omitted in certain drawings.

FIG. 1 shows a sensor frame in accordance with embodiments of the present invention.

FIG. 2 is a diagram illustrating an example usage of embodiments of the present invention.

Figure 3:
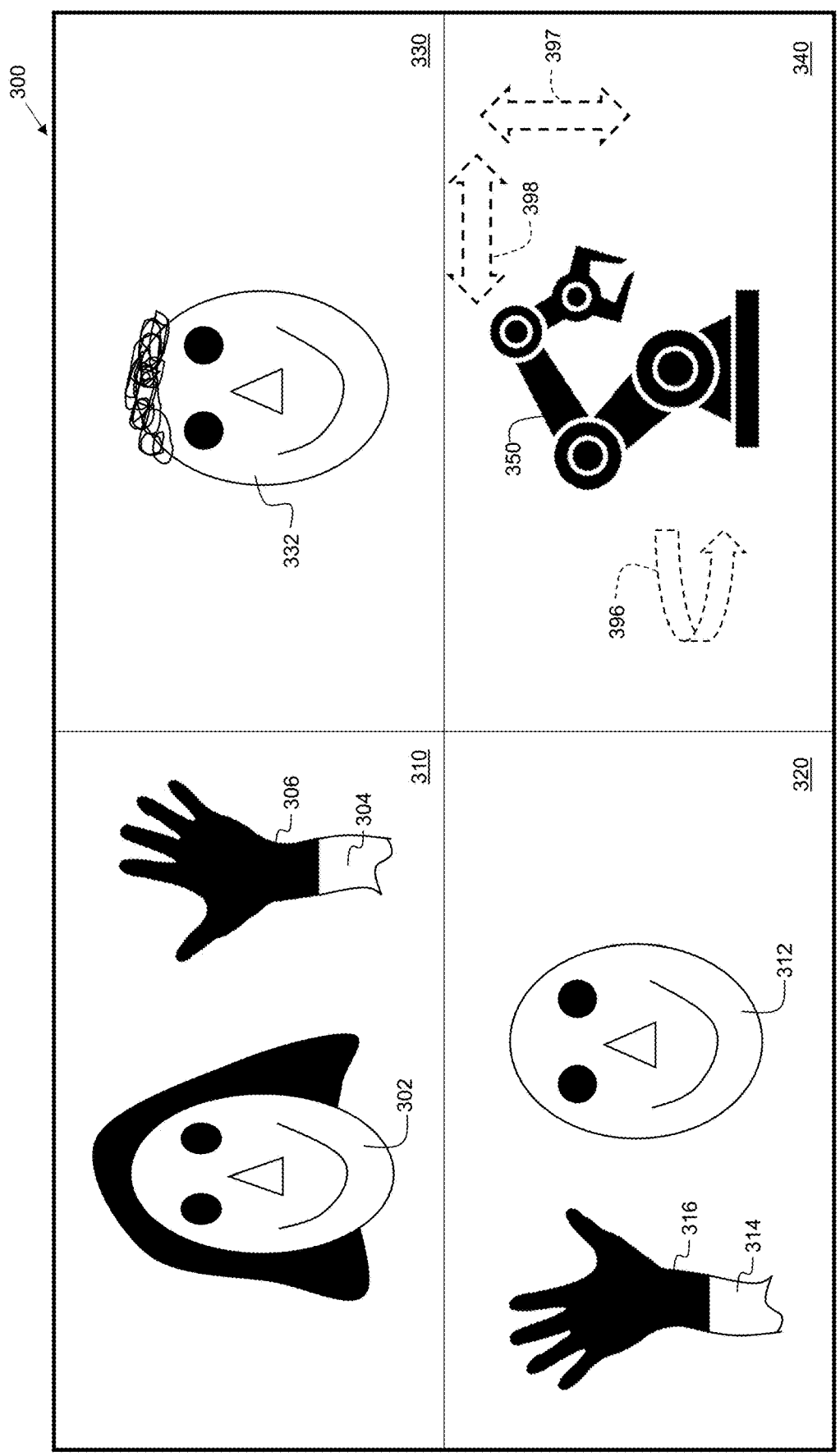

FIG. 3 is a diagram illustrating an example participant view with embodiments of the present invention.

Figure 4:
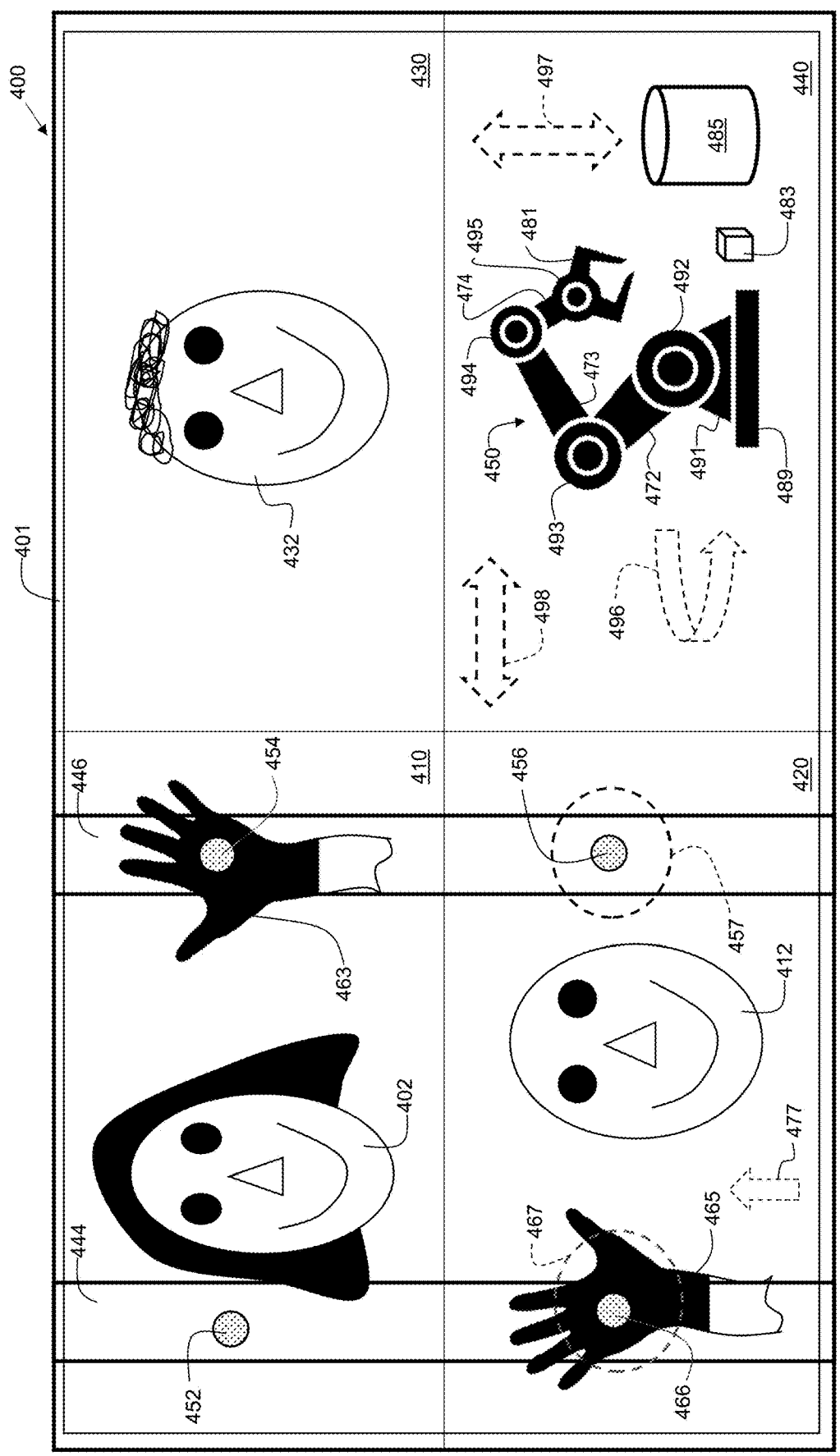

FIG. 4 is a diagram illustrating an example host view with embodiments of the present invention.

Figure 5:
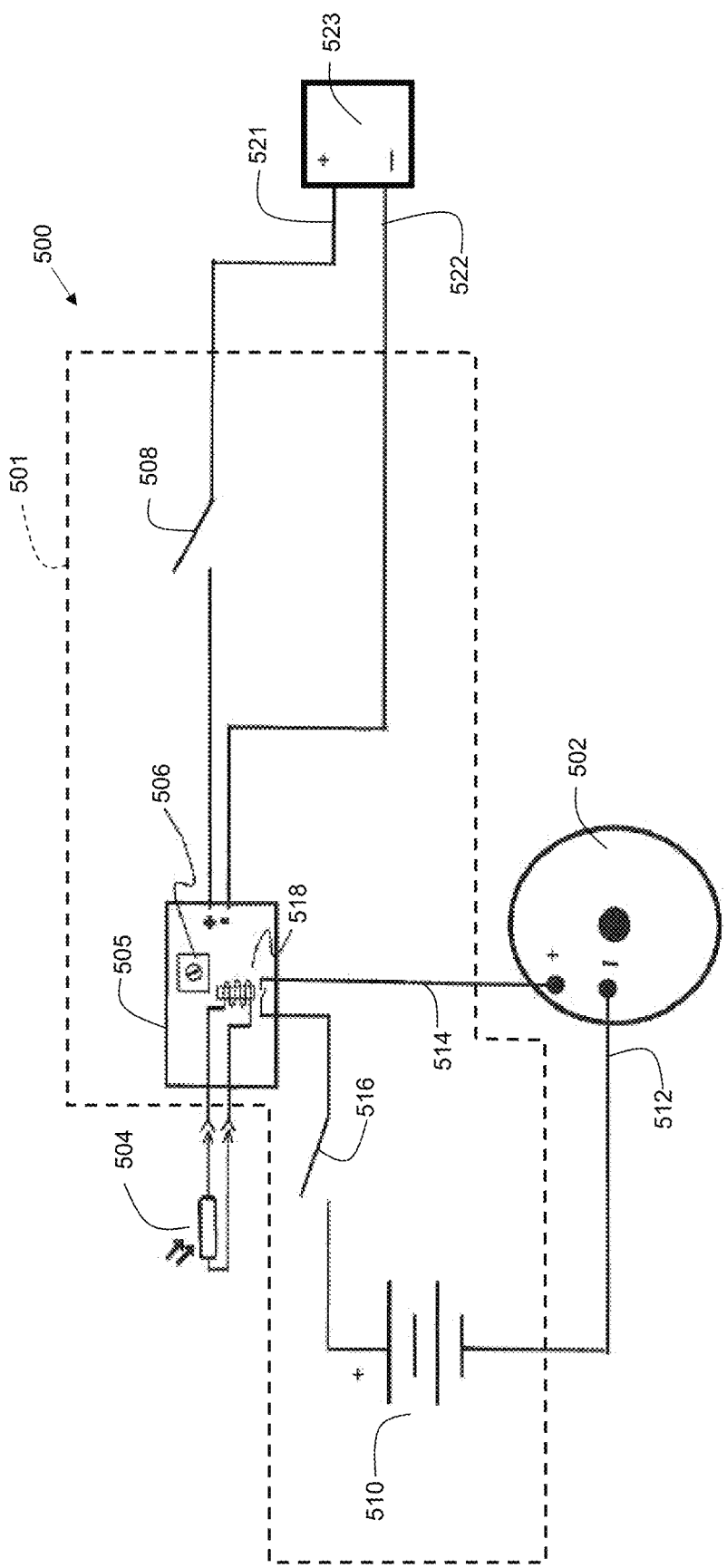

FIG. 5 shows a circuit in accordance with embodiments of the present invention.

Figure 6:
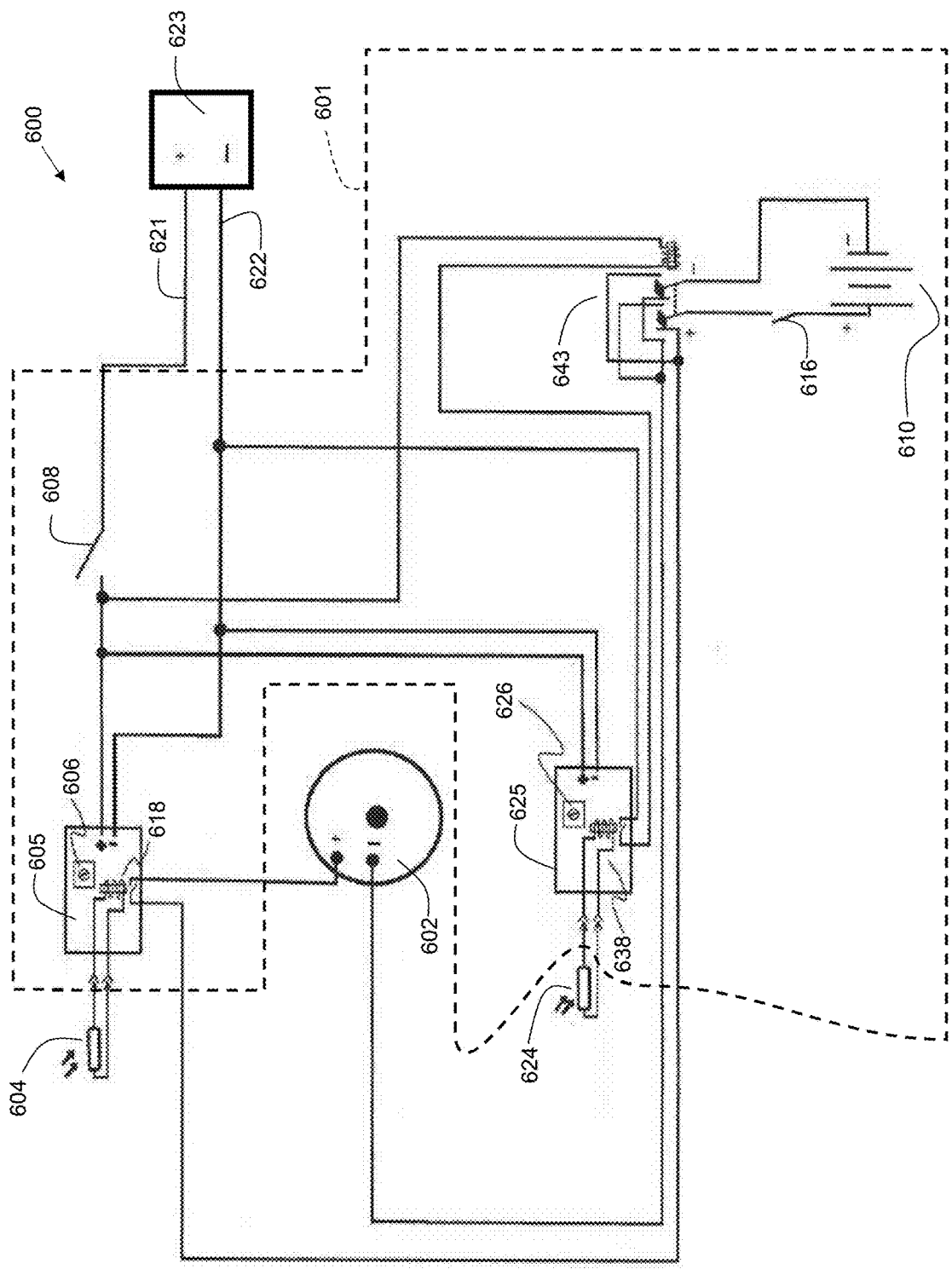

FIG. 6 shows a circuit in accordance with additional embodiments of the present invention.

Figure 7:
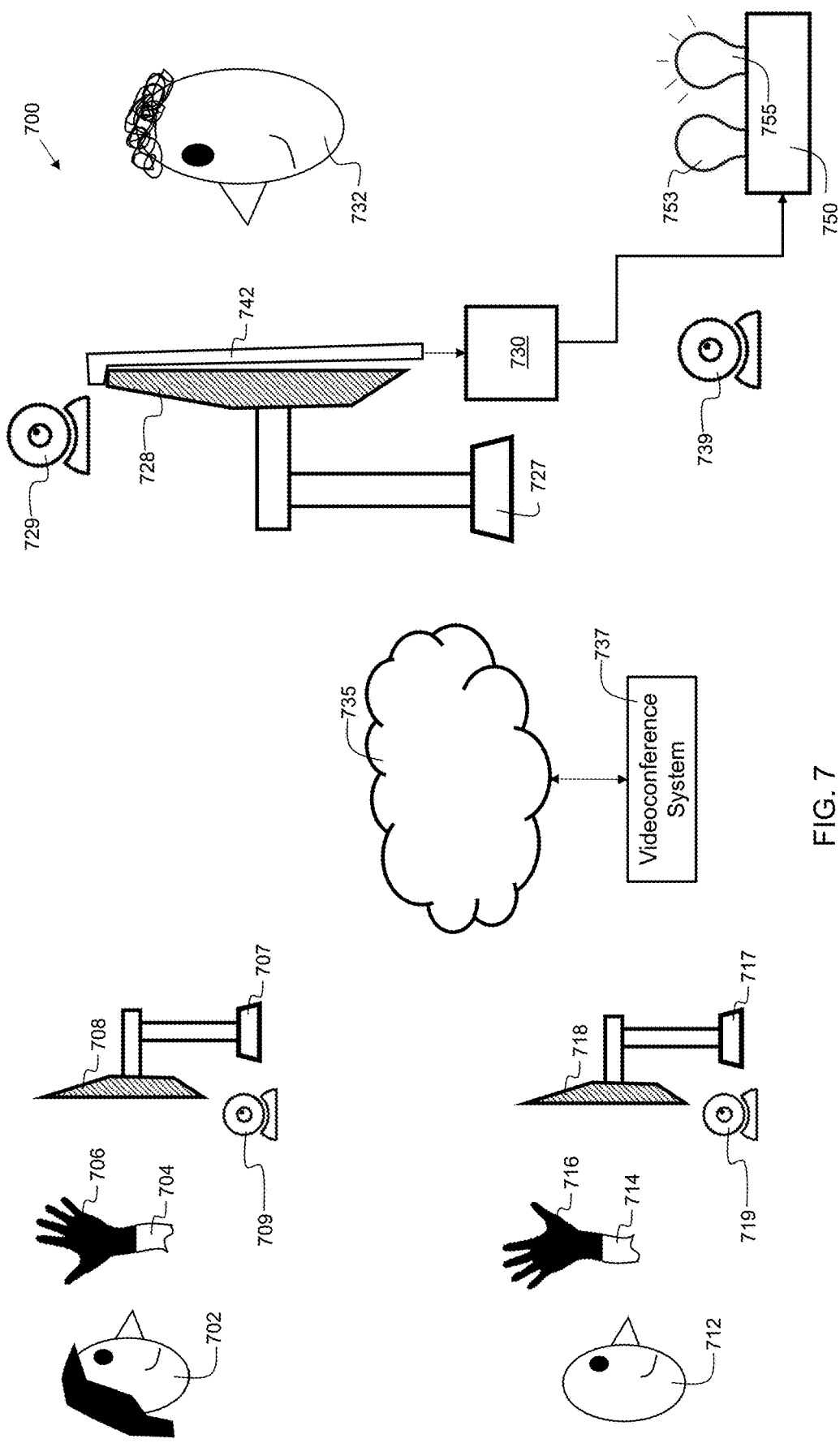

FIG. 7 is a diagram illustrating an example usage of additional embodiments of the present invention.

Figure 8:
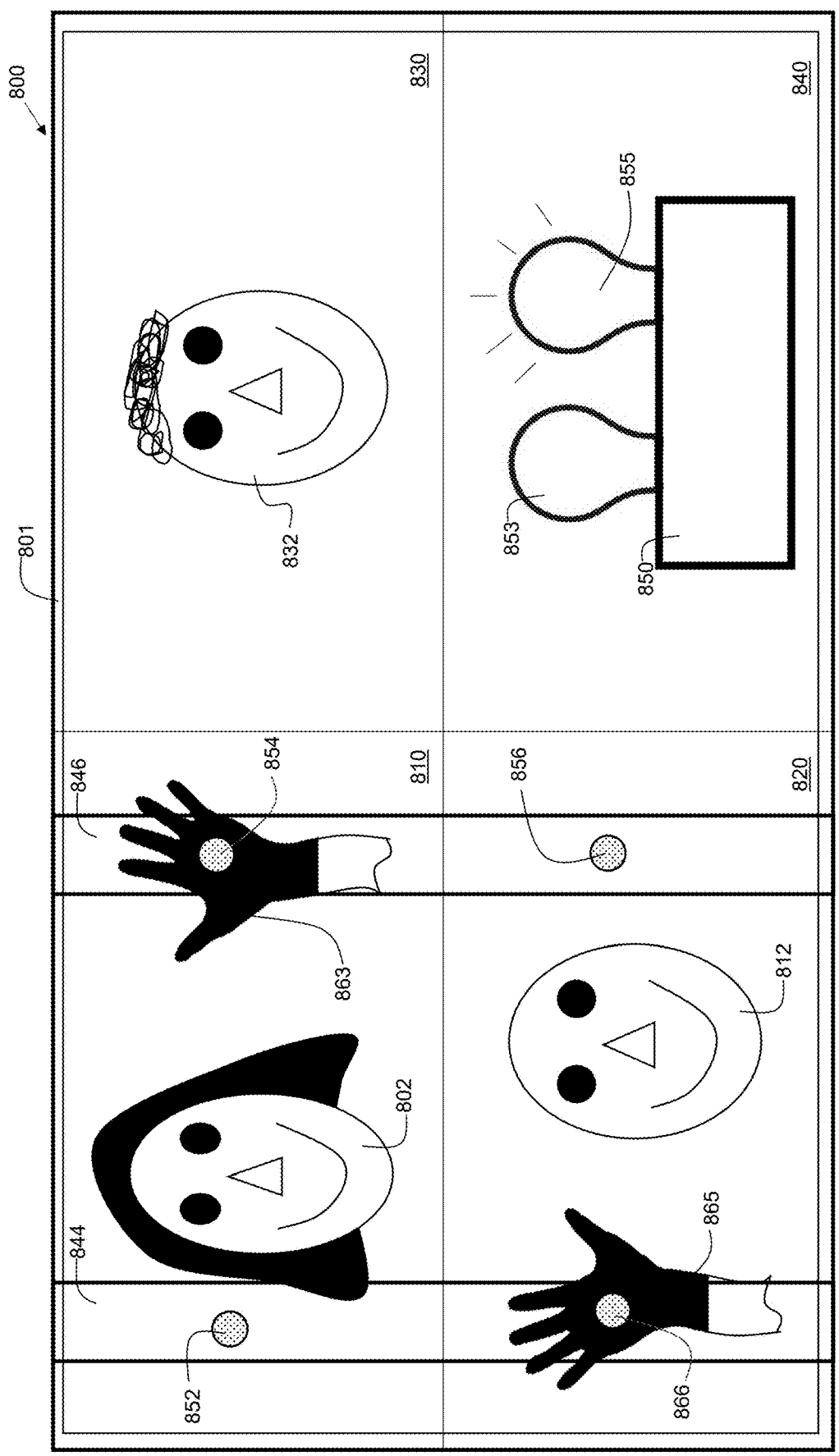

FIG. 8 is a diagram illustrating an example host view with additional embodiments of the present invention.

FIG. 9A shows details of a hinged sensor frame in an in-use configuration.

FIG. 9B shows details of a hinged sensor frame in a rotated configuration.

Figure 10:
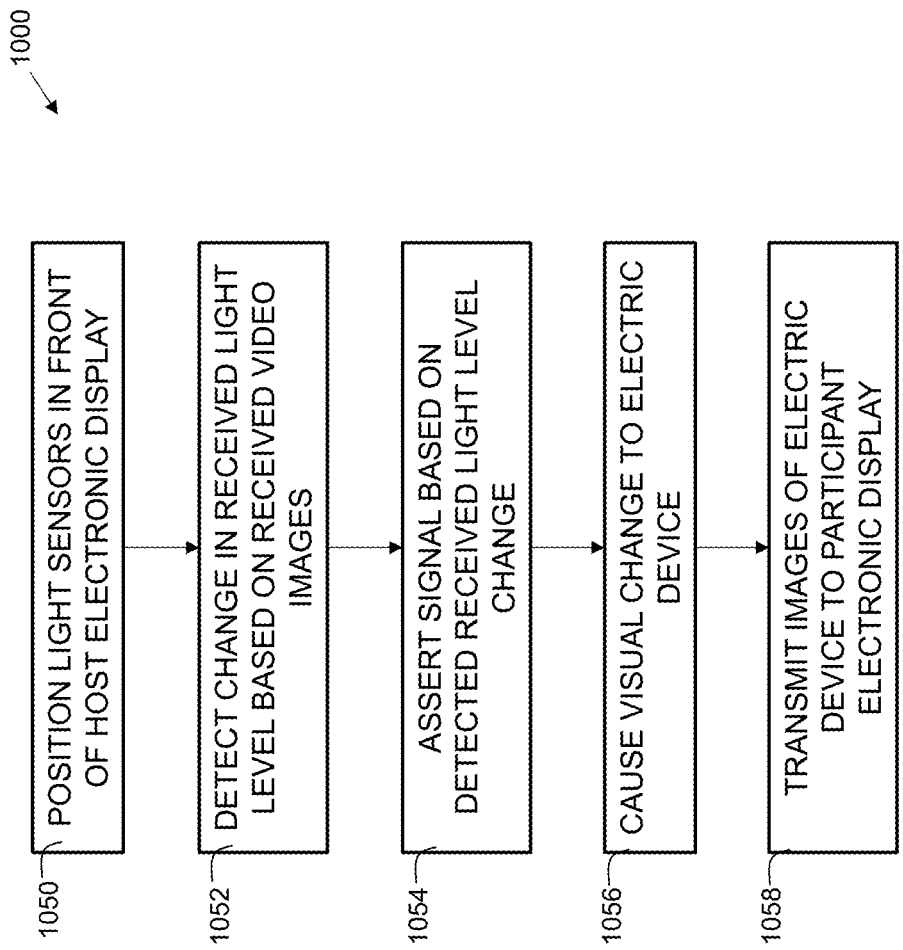

FIG. 10 is a flowchart indicating process steps for embodiments of the present invention.

Figure 11:
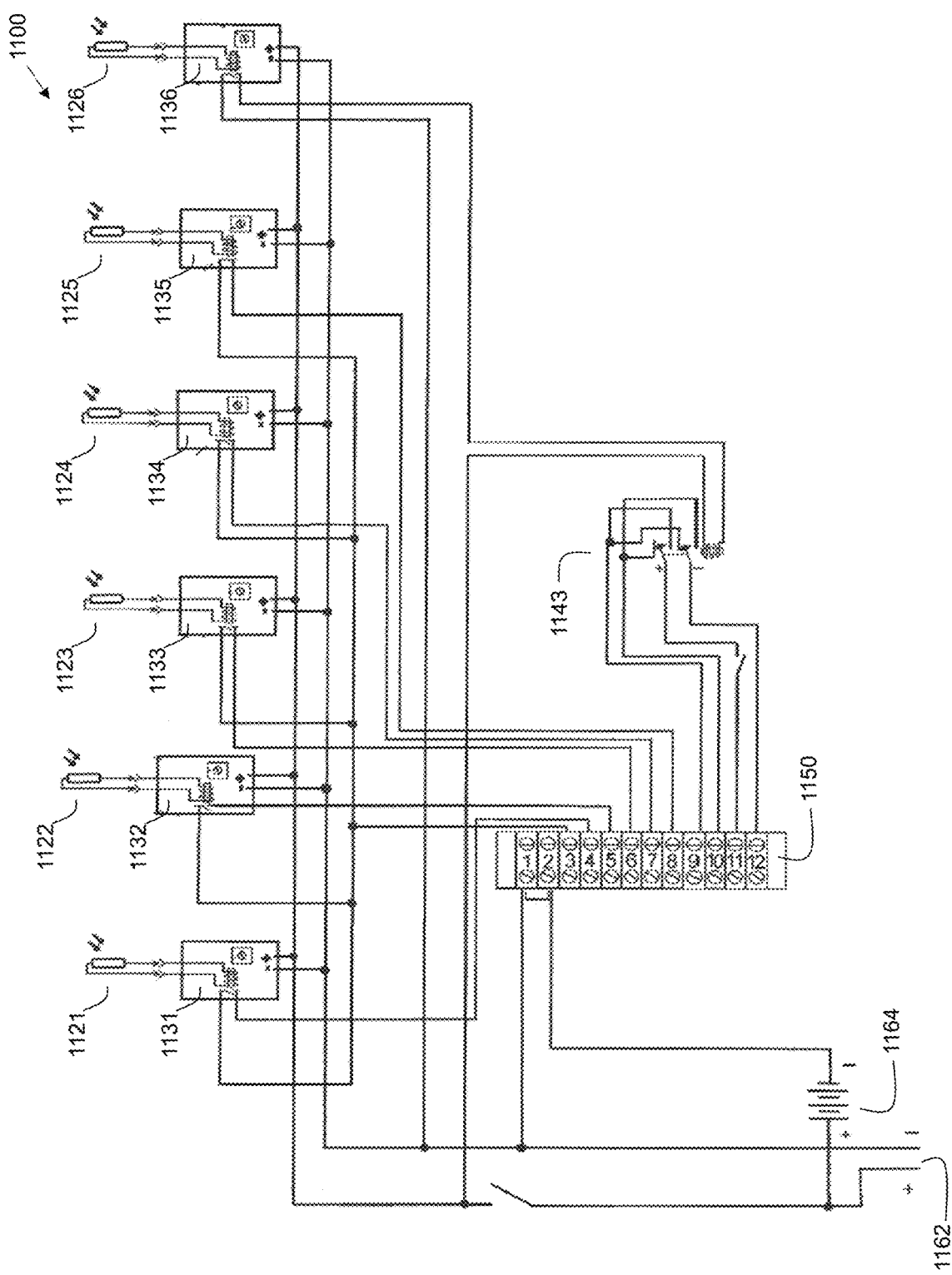

FIG. 11 shows an additional circuit for embodiments of the present invention.

DETAILED DESCRIPTION

Disclosed embodiments provide an interactive videoconference apparatus that can be used for improved engagement during a videoconference. The disclosed apparatus can be used in educational applications, team-building exercises, therapy applications, entertainment applications, gaming applications, and much more. In embodiments, videoconferences include a host and multiple participants. The host role may be that of a facilitator, teacher, or the like. Disclosed embodiments provide a frame that is attached in front of an electronic display for the host. The electronic display can be a laptop computer screen, desktop computer screen, tablet computer screen, or the like. The frame includes multiple light sensors. The light sensors are directed towards the display of the host. The participants, using a camera on (or coupled with) each participant's electronic computing device, transmit images to the host display via the videoconferencing system. In embodiments, the participants may wear dark colored gloves while in front of a light-colored background. When a participant places his/her gloved hand on the screen in a predetermined location, it significantly changes the amount of light (contrast change) received by a light sensor, causing an electric signal to be asserted. The assertion of the electric signal can be used to affect a device, such as a mechanical arm, light array, musical instrument, and/or other device. Images of the device are also broadcast in the videoconference. In this way, participants can affect the device remotely by positioning their hands in a predetermined location. This provides an engaging and entertaining activity during videoconferences.

FIG. 1 shows a sensor frame 100 in accordance with embodiments of the present invention. Sensor frame 100 comprises a bezel 102. Affixed to the bezel 102 are a plurality of spars, indicated as 104 and 106. While two spars are shown in FIG. 1, in practice, there can be more or fewer spars in some embodiments. While spars 104 and 106 are shown in a vertical orientation, spars may additionally or alternatively be oriented in a horizontal and/or diagonal orientation. The spars may be affixed to the bezel 102 via hook-and-loop fastener strips 103, magnetic strips, or other suitable mechanisms. Multiple light sensors are affixed to the spars. In FIG. 1, four light sensors, indicated as 112, 114, 116, and 118 are shown. In embodiments, the light sensors are affixed to the spars via hook-and-loop fasteners or other suitable mechanisms. This enables the light sensor position to be adjusted by the host based on the application, number of participants, and/or other criteria. In embodiments, the plurality of spars are removably attached to the frame. In embodiments, each of the plurality of light sensors are removably attached to a spar from the plurality of spars. In embodiments, the spars are comprised of plastic. In some embodiments, the spars are transparent.

The outputs of the light sensors are routed to a signal conditioning circuit 122. The signal conditioning circuit may then output a proportional electric signal based on each signal from the one or more light sensors. The proportional signals may have an increased voltage and/or current as compared with the signals that are input to the signal conditioning circuit 122. The output signals from the signal conditioning circuit 122 are input to a remote-participant-controlled device (RPCD) 130. The device 130 can be an electromechanical device such as a powered mechanical arm. The device 130 can in some embodiments, be an electrical device such as a light board having multiple lights thereon. During use, participants move their hands to create a change in received light by the sensors 112, 114, 116, and 118. The change in light causes signals to be asserted as inputs to signal conditioning circuit 122. The output signals are conditioned to control the device 130. In some embodiments, the output signals can range from 0 volts AC to 250 volts AC. In some embodiments, the output signals can range from 0 volts DC to 30 volts DC. In this way, a wide variety of devices can be controlled using embodiments of the present invention.

FIG. 2 is a diagram 200 illustrating an example usage of embodiments of the present invention. As shown in diagram 200, there are two participants, a first participant 202, and a second participant 212. While two participants are shown in FIG. 2, in practice, there can be more or fewer participants in some embodiments.

Participant 202 utilizes an electronic communication device 207, which may be a desktop computer, laptop computer, or other suitable electronic communication device capable of communication with a videoconference system 237 via network 235. In embodiments, network 235 may include the Internet. Videoconference system 237 may include Zoom, Webex, Google Meet, or other suitable videoconference system.

Participant 202 has arm 204, with a glove 206 donned on his/her hand. Preferably, the glove 206 is a dark color to provide contrast against a light background. The participant utilizes a camera 209 which may be integrated into, or coupled with, the electronic communication device 207. The participant utilizes an electronic display 208, which may be an LCD (liquid crystal display) display, OLED (organic light-emitting diode) display, or other suitable display type. In some embodiments, the camera 209, electronic communication device 207, and electronic display 208 are all integrated into a single package, such as a laptop or tablet computer. While participant 202 is shown using one glove 206, in practice, both hands may be gloved for an activity during a videoconference with disclosed embodiments.

Similar to participant 202, participant 212 utilizes an electronic communication device 217, which may be a desktop computer, laptop computer, or other suitable electronic communication device capable of communication with a videoconference system 237 via network 235.

Participant 212 has arm 214, with a glove 216 donned on his/her hand. Preferably, the glove 216 is a dark color to provide contrast against a light background. The participant utilizes a camera 219 which may be integrated into, or coupled with, the electronic communication device 217. The participant utilizes an electronic display 218, which may be an LCD display, OLED display, or other suitable display type. In some embodiments, the camera 209, electronic communication device 217, and electronic display 218 are all integrated into a single package, such as a laptop or tablet computer. While participant 212 is shown using one glove 216, in practice, both hands may be gloved for an activity during a videoconference with disclosed embodiments. Furthermore, in some use cases, the contrast-inducing object may not be a glove, but instead can be another object, such as a hand-held sign. In some use cases, the contrast-inducing object may be another article of clothing, such as a shirt with a high contrast pattern. A wide variety of contrast-inducing objects may be used with embodiments of the present invention.

Host 232 is facilitating the videoconference. Host 232 utilizes an electronic communication device 227, which may be a desktop computer, laptop computer, or other suitable electronic communication device capable of communication with a videoconference system 237 via network 235. A first camera 229 is arranged to acquire video images of the host 232. The host utilizes an electronic display 228, which may be an LCD display, OLED display, or other suitable display type. In some embodiments, the camera 229, electronic communication device 227, and electronic display 228 are all integrated into a single package, such as a laptop or tablet computer.

A second camera 239 is arranged to acquire images of the remote-participant-controlled device (RPCD) 250. As shown in FIG. 2, the RPCD is a multi-joint motorized mechanical arm. The display 228 has a frame 242 installed thereon. Frame 242 may be similar to frame 100 shown in FIG. 1. Sensors on the frame 242 input signals to signal conditioning circuit 230. The output signals from the signal conditioning circuit 230 supply power to the RPCD 250.

FIG. 3 shows a display 300 with an example participant view with embodiments of the present invention. In embodiments, the videoconference is configured to display in a "gallery" mode where each participant 302 and 312, the host 332, and the RPCD 350 are displayed on the screen. The participants 302 and 312 can move their gloved hand(s) in the location corresponding to a sensor on the host display, to cause signals to be asserted (generated), to cause motion of the device 350. In this way, the participants are highly engaged in the videoconference. This is especially beneficial for children during a remote-schooling session or other online activity, as the interactivity of disclosed embodiments can help promote more attentive and focused behavior by the students.

In this view, there are four video panes, 310, 320, 330, and 340. In video pane 310, participant 302 is holding up her left arm 304 with a glove 306 on the left hand. In video pane 320, participant 312 is holding up his right arm 314 with a glove 316 on the right hand. In practice, a participant may utilize a glove on both hands for additional signal generation capabilities. In video pane 330, the host 332 is visible and can speak with the participants 302 and 312. In video pane 340, video of the RPCD 350 is shown, and the participants can cause the RPCD 350 to move, based on positioning of their gloved hands. In some embodiments, the mechanical arm can be swiveled in the direction indicated by arrow 396, and the arm may be moved vertically as indicated by arrow 397, and/or horizontally as indicated by arrow 398, and/or a combination of simultaneous horizontal, vertical, and/or swivel movement.

FIG. 4 shows a display 400 with an example host view with embodiments of the present invention. Thus, display 400 represents the view that the host sees when conducting a videoconference with an RPCD. In this view, there are four video panes, 410, 420, 430, and 440. In video pane 410, participant 402 is holding up her left hand that is donned with a glove 463. In video pane 420, participant 412 is holding up his right hand that is donned with a glove 465. In practice, a participant may utilize a glove on both hands for additional signal generation capabilities. In video pane 430, the host 432 is visible and can speak with the participants 402 and 412 via the videoconference system. In video pane 440, video of the RPCD 450 is shown, and the participants can cause the RPCD 450 to move, based on positioning of their gloved hands.

Frame 401 is installed on the display 400 via fasteners such as clips, hook-and-loop (e.g., Velcro), magnets, or other suitable fasteners (see 103 of FIG. 1). Spar 444 and spar 446 are installed on the frame 401. Light sensor 452 and light sensor 466 are affixed to spar 444. Light sensor 454 and light sensor 456 are affixed to spar 446. As can be seen in this view, the glove 465 of participant 412 is raised by moving it in the direction indicated by arrow 477 such that it is positioned at a location to be rendered on the display 400 in front of sensor 466. Similarly, sensor 456 does not have a glove or other object rendered in front of it. Region 467 is a region of display 400 proximal to sensor 466. Region 467 may be referred to as a "localized area" with respect to sensor 466, as it includes the area in which changes in light are detected by sensor 466. Similarly, region 457 is a region of display 400 proximal to sensor 456. Region 457 may be referred to as a "localized area" similar to region 467. In embodiments, the localized area is a circle having a radius ranging from 8 millimeters to 20 millimeters. The region 466 includes more dark area than region 457, due to the positioning of glove 465. This causes sensor 466 to assert a signal that, when conditioned by a signal conditioning circuit, causes movement of the RPCD 450.

In the example shown in FIG. 4, the RPCD 450 is a mechanical arm. In some embodiments, the mechanical arm can be used for a team-building exercise. As an example, the mechanical arm may have a motor to control swiveling, and another motor to control the elevation of the claw 481, and another motor to control pinching of the claw (gripper) 481. In one example usage, the participants have to work together to pick up an object 483 with the claw 481 by putting their hands in the proper location in a coordinated manner to cause the claw 481 to grasp the object 483 and place it in the container 485. This is an example, and many other variations of team-building exercises are possible with disclosed embodiments.

In some embodiments, the mechanical arm can be swiveled in the direction indicated by arrow 496, and the arm may be moved vertically as indicated by arrow 497, and/or horizontally as indicated by arrow 498, and/or a combination of simultaneous horizontal, vertical, and/or swivel movement. In some embodiments, the mechanical arm (RPCD 450) includes a first motor (base motor) 491 disposed on a base 489 for swiveling of the arm, a second motor 492 for moving a first link 472 of the arm, a third motor 493 for moving a second link 473 of the arm, a third motor 494 for moving a third link 474 of the arm, and a fourth motor (gripper motor) 495 for moving the claw (gripper) 481. Other embodiments may have more, fewer, or different arrangements of links and/or motors. Each motor may be operated based on signals asserted by one or more light sensors that are attached to the frame on the electronic display of the host. In some embodiments, one or more motors may be energized based on an asserted signal from a first light sensor, and direction of the motor may be changed when energized, based on an asserted signal from a second light sensor. In this way, a complex device such as RPCD 450 can be controlled by remote participants by manipulating their limbs or other items in order to cause the corresponding signals to be asserted based on changing received light by the light sensors.

Embodiments include a frame; a plurality of spars affixed to the frame; a plurality of light sensors affixed to the plurality of spars; a signal conditioning circuit electrically connected to the plurality of light sensors; a sensor output electrically connected to the signal conditioning circuit; and an electrically operated device electrically connected to the sensor output. In embodiments, the electrically operated device comprises a mechanical arm, the mechanical arm comprising: a base; a first link, the first link rotatably attached to the base; a second link, the second link rotatably attached to the first link; a gripper, the gripper rotatably attached to the second link; a base motor, configured and disposed to rotate the first link with respect to the base; a first link motor, configured and disposed to extend the first link with respect to the base; a second link motor, configured and disposed to extend the second link with respect to the base; and a gripper motor configured and disposed to control the gripper. In embodiments, the control of the gripper includes a squeezing motion to allow picking up of an object (e.g., 483), and a releasing motion to allow releasing of the object.

FIG. 5 shows a circuit 500 in accordance with embodiments of the present invention. In embodiments, the elements within region 501 may be included in a signal conditioning circuit. A light sensor 504 may be mounted on a spar such that it receives light from an electronic display associated with a host. In embodiments, the light sensor 504 may include a photoelectric cell. A photoelectric cell may include a resistor that changes resistance depending on the amount of light incident on it. In embodiments, the photocell operates on semiconductor photoconductivity: the energy of photons hitting the semiconductor frees electrons to flow, decreasing the resistance. The sensor 504 is coupled to a control module 505 that includes a relay 518. In embodiments, the relay 518 is an SPDT (single pole double throw) relay. The control module 505 may include a potentiometer 506 to adjust the sensitivity based on the display and change in contrast. In use, the potentiometer 506 is adjusted such that when a glove is positioned over the sensor, such as 465 of FIG. 4, the relay closes, and provides power from power source 510 to the remote-participant-controlled device 502 via power lines 512 and 514. Power source 510 may be an AC power source or a DC power source. In embodiments, the power source 510 may range from 0 VDC to 30 VDC. In other embodiments, the power source 510 may range from 0 VAC to 250 VAC. In this way, a wide variety of devices may be controlled by disclosed embodiments.

A source switch 508 and a module on/off switch 516 may be included to provide a further level of safety to prevent inadvertent energizing of the device 502 during calibration or other servicing. Power lines 521 and 522 provide power to operate the module 505 from module power source 523. In embodiments, module power source 523 provides direct current (DC) voltage to enable operation of relay 518 within module 505. In some embodiments, module 505 may be an XH-M131 module, or other similar module.

FIG. 6 shows a circuit 600 in accordance with additional embodiments of the present invention. In embodiments, the elements within region 601 may be included in a signal conditioning circuit. A first light sensor 604 may be mounted on a spar such that it receives light from an electronic display associated with a host. In embodiments, the light sensor 604 may include a photoelectric cell. A photoelectric cell may include a resistor that changes resistance depending on the amount of light incident on it. In embodiments, the photocell operates on semiconductor photoconductivity: the energy of photons hitting the semiconductor frees electrons to flow, decreasing the resistance. The sensor 604 is coupled to a first control module 605 that includes a relay 618. In embodiments, the relay 618 is an SPDT relay. The control module 605 may include a potentiometer 606 to adjust the sensitivity based on the display and change in contrast. In use, the potentiometer 606 is adjusted such that when a glove is positioned over the sensor, such as 465 of FIG. 4, the relay closes, and provides power from power source 610 to the remote-participant-controlled device 602. Power source 610 may be an AC power source or a DC power source. In embodiments, the power source 610 may range from 0 VDC to 30 VDC. In other embodiments, the power source 610 may range from 0 VAC to 250 VAC. In this way, a wide variety of devices may be controlled by disclosed embodiments.

A source switch 608 and a module on/off switch 616 may be included to provide a further level of safety to prevent inadvertent energizing of the device 602 during calibration or other servicing. Power lines 621 and 622 provide power to operate the module 605 from module power source 623. In embodiments, module power source 623 provides direct current (DC) voltage to enable operation of relay 618 within module 605. In some embodiments, module 605 may be an XH-M131 module, or other similar module.

Circuit 600 further includes a second light sensor 624. The sensor 624 is coupled to a second control module 625 that includes a relay 638. In some embodiments, module 625 may be an XH-M131 module, or other similar module. In embodiments, the relay 638 is an SPDT relay. The control module 625 may include a potentiometer 626 to adjust the sensitivity based on the display and change in contrast. In use, the potentiometer 626 is adjusted such that when a glove is positioned over the sensor, such as 465 of FIG. 4, the relay closes, and asserts a signal that is input to polarity switching DPDT (double pole double throw) relay 643. Control module 625 also receives power from module power source 623. When relay 643 activates in response to a reduction in light input to sensor 624, it reverses the polarity of power applied to device 602. This has useful applications for motor-operated RPCDs. In this case, the motor operates in a first direction while sufficient light is entering the sensor 624. Then, when the amount of light entering the sensor is reduced (e.g., due to a dark glove being placed such that the image of the glove is proximal to the sensor), the relay 643 activates to reverse the polarity of power applied to the motor, thereby reversing the position of the motor. In some embodiments, one participant can control the polarity of the motor, while another participant can activate or deactivate the motor. Two participants can work together to operate the RPCD 602. In embodiments, the RPCD 602 may include multiple motors that can each have the direction of operation changed based on signals from a light sensor that cause a polarity change in supplied power to the RPCD 602.

In embodiments, the electrically operated device comprises a mechanical arm, the mechanical arm comprising: a base; a first link, the first link rotatably attached to the base; a second link, the second link rotatably attached to the first link; a gripper, the gripper rotatably attached to the second link; a base motor, configured and disposed to rotate the first link with respect to the base; a first link motor, configured and disposed to extend the first link with respect to the base; a second link motor, configured and disposed to extend the second link with respect to the base; and a gripper motor configured and disposed to control the gripper. In embodiments, the first relay is configured and disposed to activate the base motor. In embodiments, the second relay is configured and disposed to select a polarity for the power that gets applied to the base motor. Embodiments can further include a third relay, the third relay configured and disposed to switch polarity of power directed to the base motor in response to a reduction in light below a predetermined threshold to the second light sensor.

FIG. 7 is a diagram 700 illustrating an example usage of additional embodiments of the present invention. As shown in diagram 700, there are two participants, a first participant 702, and a second participant 712. While two participants are shown in FIG. 7, in practice, there can be more or fewer participants in some embodiments.

Participant 702 utilizes an electronic communication device 707, which may be a desktop computer, laptop computer, or other suitable electronic communication device capable of communication with a videoconference system 737 via network 735. In embodiments, network 735 may include the Internet. Videoconference system 737 may include Zoom, Webex, Google Meet, or other suitable videoconference system.

Participant 702 has arm 704, with a glove 706 donned on his/her hand. Preferably, the glove 706 is a dark color to provide contrast against a light background. The participant utilizes a camera 709 which may be integrated into, or coupled with, the electronic communication device 707. The participant utilizes an electronic display 708, which may be an LCD display, OLED display, or other suitable display type. In some embodiments, the camera 709, electronic communication device 707, and electronic display 708 are all integrated into a single package, such as a laptop or tablet computer. While participant 702 is shown using one glove 706, in practice, both hands may be gloved for an activity during a videoconference with disclosed embodiments.

Similar to participant 702, participant 712 utilizes an electronic communication device 717, which may be a desktop computer, laptop computer, or other suitable electronic communication device capable of communication with a videoconference system 737 via network 735.

Participant 712 has arm 714, with a glove 716 donned on his/her hand. Preferably, the glove 716 is a dark color to provide contrast against a light background. The participant utilizes a camera 719 which may be integrated into, or coupled with, the electronic communication device 717. The participant utilizes an electronic display 718, which may be an LCD display, OLED display, or other suitable display type. In some embodiments, the camera 719, electronic communication device 717, and electronic display 718 are all integrated into a single package, such as a laptop or tablet computer. While participant 712 is shown using one glove 716, in practice, both hands may be gloved for an activity during a videoconference with disclosed embodiments. Furthermore, in some use cases, the contrast-inducing object may not be a glove, but instead can be another object, such as a hand-held sign. In some use cases, the contrast-inducing object may be another article of clothing, such as a shirt with a high contrast pattern. A wide variety of contrast-inducing objects may be used with embodiments of the present invention.

Host 732 is facilitating the videoconference. Host 732 utilizes an electronic communication device 727, which may be a desktop computer, laptop computer, or other suitable electronic communication device capable of communication with a videoconference system 737 via network 735. A first camera 729 is arranged to acquire video images of the host 732. The host utilizes an electronic display 728, which may be an LCD display, OLED display, or other suitable display type. In some embodiments, the camera 729, electronic communication device 727, and electronic display 728 are all integrated into a single package, such as a laptop or tablet computer.

A second camera 739 is arranged to acquire images of the remote-participant-controlled device (RPCD) 750. As shown in FIG. 7, the RPCD 750 is a light board comprising a first light 753 and a second light 755. As shown in FIG. 7, light 753 is not illuminated, while light 755 is illuminated, as indicated by the thin lines emanating from light 755. In embodiments, the first light 753 may be of a different color than the second light 755. In embodiments, the first light 753 may be green and the second light 755 may be red. Other color combinations are possible. In embodiments, the electrically operated device comprises a light array, the light array comprising: a first light, the first light electrically coupled to a first light sensor of the plurality of light sensors; and a second light, the second light electrically coupled to a second light sensor of the plurality of light sensors. In embodiments, the first light emits light of a first color and the second light emits light of a second color.

The display 728 has a frame 742 installed thereon. Frame 742 may be similar to frame 100 shown in FIG. 1. Sensors on the frame 742 input signals to signal conditioning circuit 730. The output signals from the signal conditioning circuit 730 supply power to the RPCD 750. Thus, the embodiment shown in FIG. 7 is similar to that shown in FIG. 2, with the difference being the RPCD 750 being a light board. The RPCDs shown in FIG. 2 and FIG. 7 are exemplary. Some RPCDs may include lights, sound-producing elements such as buzzers, motor-controlled elements such as mechanical arms, and/or other elements suitable for observation via videoconference system 737.

FIG. 8 shows a display 800 with an example host view with embodiments of the present invention. Thus, diagram 800 represents the view that the host sees when conducting a videoconference with an RPCD 850. In this view, there are four video panes, 810, 820, 830, and 840. In video pane 810, participant 802 is holding up her left hand donning a glove 863. In video pane 820, participant 812 is holding up his right hand donning a glove 865. In practice, a participant may utilize a glove on both hands for additional signal generation capabilities. In video pane 830, the host 832 is visible and can speak with the participants 802 and 812. In video pane 840, video of the RPCD 850 is shown, and the participants can cause the RPCD 850 to move, based on positioning of their gloved hands.

Frame 801 is installed on the display 800 via fasteners such as clips, hook-and-loop (e.g., Velcro), magnets, or other suitable fasteners (see 103 of FIG. 1). Spar 844 and spar 846 are installed on the frame 801. Light sensor 852 and light sensor 866 are affixed to spar 844. Light sensor 854 and light sensor 856 are affixed to spar 846. As can be seen in this view, the glove 865 of participant 812 is positioned such that it is rendered on the display 800 in front of sensor 866. Similarly, sensor 856 does not have a glove or other object rendered in front of it. The change in light levels when the image of glove 865 is positioned as shown on display 800 causes sensor 866 to assert a signal that, when conditioned by a signal conditioning circuit, causes operation of the RPCD 850.

In the example shown in FIG. 8, the RPCD 850 is a light board. In some embodiments, the light board can be used for games, educational applications such as quizzes, therapy applications such as testing reflexes, cognitive and/or coordination-building exercises such as illuminating the lights 853 and 855 in a sequence called out by the host 832. As shown in FIG. 8, light 853 is not illuminated, while light 855 is illuminated, as indicated by the thin lines emanating from light 855. In embodiments, the lights 853 and 855 are configured to illuminate based on activation of one or more of the sensors 852, 854, 856, and 866. In this way, the lights of RPCD 850 illuminate based on position of the gloves 863 and 865, enabling an engaging videoconference experience for the participants 802 and 812. There are many applications for entertainment, education, therapy, training, gaming, and more with disclosed embodiments.

FIG. 9A shows details of a hinged sensor frame in an in-use configuration. FIG. 9A is a side view showing an electronic display 988 associated with the host of the videoconference. The electronic display 988 is mounted on a stand 990. The frame 902 is affixed to the display 988 at the top of the display 988 by fixed mount 931. Fixed mount 931 is a top portion of the frame 902. In embodiments, the fixed mount 931 is attached to a top surface 937 of the display 988 via hook-and-loop fastener, adhesive, screws, and/or other suitable technique. Affixed to frame 902 is light sensor 952 and light sensor 956, which are positioned to receive light emanating from display 988. Frame 902 may include multiple spars, such as shown in FIGS. 1 (104 and 106). The frame 902 further comprises a hinge 933 allowing the portion of the frame in front of the display 988 to be rotated upwards as indicated by arrow 963. FIG. 9B shows details of the hinged sensor frame of FIG. 9A in a rotated configuration when not in use. In this way, the frame 902 can be conveniently moved as to not obstruct the display 988 when an interactive videoconference in accordance with disclosed embodiments is not in use, allowing unobstructed view of the electronic display 988. Embodiments can further include a hinge disposed on a top portion of the frame.

FIG. 10 is a flowchart 1000 indicating process steps for embodiments of the present invention. At 1050, light sensors are positioned in front of an electronic display associated with a host. Examples include light sensors 452 and 454 of FIG. 4. At 1052, a change in received light level is detected based on received video images. Examples include detecting a change in received light from localized area (region) 467 of FIG. 4 by sensor 466, as compared with the amount of received light from localized area 457 of FIG. 4 by sensor 456. At 1054, a signal is asserted based on the detected received light change. The signal is input to a signal conditioning circuit such as 122 of FIG. 1. Based on the asserted signal, a visual change to the electric device is made at 1056. This change can include motion, such as motion of the device 450 shown in pane 440 of FIG. 4. This change can include illumination or disabling of lights, such as indicated in device 850 of pane 840 of FIG. 8. At 1058, the images of the change are transmitted to a participant electronic display. An example includes the motion of device 350 shown in pane 340 of FIG. 3.

Embodiments provide a method for operating an electrical device via a videoconference system, comprising: positioning a plurality of light sensors in front of a first electronic display at a first location, such that each light sensor of the plurality of light sensors receives light from a localized area of the first electronic display; detecting a change in received light level below a predetermined threshold for one or more light sensors of the plurality of light sensors based on a received video feed from a second location; asserting a signal for each of the one or more light sensors that detected the change in received light level; causing a visual change in an electric device located at the first location; sending images of the electric device to a second electronic display at the second location using cameras and the video conferencing system; wherein the second location is different from the first location. In embodiments, the light sensors are affixed to a frame, and the method further comprises affixing the frame to the first electronic display. In embodiments, the electric device comprises a motorized mechanical arm comprising a first motor and a second motor, the method further comprising: operating the first motor in response to detecting a change in received light level below a predetermined threshold for a first light sensor of the plurality of light sensors. Embodiments can further include operating the second motor in response to detecting a change in received light level below a predetermined threshold for a second light sensor of the plurality of light sensors. Embodiments can further include operating the second motor in response to detecting a change in received light level below a predetermined threshold for a second light sensor of the plurality of light sensors. Embodiments can further include changing an operating direction of the first motor in response to detecting a change in received light level below a predetermined threshold for a third light sensor of the plurality of light sensors. Embodiments can further include further changing an operating direction of the second motor in response to detecting a change in received light level below a predetermined threshold for a fourth light sensor of the plurality of light sensors.

FIG. 11 shows an additional circuit 1100 for embodiments of the present invention. Circuit 1100 shows how multiple sensors and control modules may be configured to control an RPCD. Circuit 1100 includes light sensors 1121, 1122, 1123, 1124, 1125, and 1126. These light sensors may be affixed to spars of a frame such as shown in FIG. 1 with light sensors 112 and 114 affixed to spar 104. Each light sensor is coupled to a respective control module, indicated as 1131, 1132, 1133, 1134, 1135, and 1136. The control modules 1131-1136 may be similar to control module 505 previously described.

Circuit 1100 may further include DPDT relay 1143. Relay 1143 may be used to enable a polarity change, allowing a connected motor to reverse its direction. As shown in circuit 1100, the polarity change is controlled by module 1136, which is coupled to light sensor 1126. Relay 1143 may be similar to relay 643 previously described. Circuit 1100 may include a battery power source 1164. Additionally, or alternatively, an external power source connection 1162 may be used with an external power supply (not shown). A terminal block 1150 is a convenient way to connect an RPCD, and can accommodate a variety of different devices. This allows the host to conveniently swap out RPCDs for different videoconferences that he/she may host.

As can now be appreciated, disclosed embodiments provide techniques and apparatuses for interactive videoconferences. Utilizing the components and techniques described, interactive videoconferences that provide improved engagement and effectiveness can be achieved. Light sensors affixed to a frame in front of the electronic display associated with a host are configured to receive light from a localized area of the display. When a remote participant takes an action to cause a significant change in received light, by moving a dark object to a location such that it is rendered on the host electronic display in front of the light sensor, the light sensor asserts a signal. Based on the asserted signal, the state of an electrical and/or electromechanical device located at the premises of the host is changed in a way that is visible and/or audible to the remote participants via the videoconference system.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for operating an electrical device via a videoconference system, comprising:

positioning a plurality of light sensors in front of a first electronic display at a first location, such that each light sensor of the plurality of light sensors receives light from a localized area of the first electronic display;

detecting a change in received light level below a predetermined threshold for one or more light sensors of the plurality of light sensors based on a received video feed from a second location;

asserting a signal for each of the one or more light sensors that detected the change in received light level;

causing a visual change in an electric device located at the first location;

sending images of the electric device to a second electronic display at the second location; wherein the second location is different from the first location.

2. The method of claim 1, wherein the plurality of light sensors are affixed to a frame, and further comprising affixing the frame to the first electronic display.

3. The method of claim 1, wherein the electric device comprises a motorized mechanical arm comprising a first motor and a second motor, the method further comprising:

operating the first motor in response to detecting a change in received light level below a predetermined threshold for a first light sensor of the plurality of light sensors.

4. The method of claim 3, further comprising operating the second motor in response to detecting a change in received light level below a predetermined threshold for a second light sensor of the plurality of light sensors.

5. The method of claim 4, further comprising, changing an operating direction of the first motor in response to detecting a change in received light level below a predetermined threshold for a third light sensor of the plurality of light sensors.

6. The method of claim 5, further comprising, changing an operating direction of the second motor in response to detecting a change in received light level below a predetermined threshold for a fourth light sensor of the plurality of light sensors.

* * * * *